United States Patent [19]
Yoneoka

[11] Patent Number: 5,212,608
[45] Date of Patent: May 18, 1993

[54] HEAD SLIDER FOR MAGNETIC DISK DRIVE, HAVING SIDE RAILS WITH GRADUALLY INCREASING WIDTH FORMING A SHALLOW RECESS

[75] Inventor: Seizi Yoneoka, Kanagawa, Japan

[73] Assignee: Fujitsu Limited, Kanagawa, Japan

[21] Appl. No.: 729,294

[22] Filed: Jul. 12, 1991

[30] Foreign Application Priority Data

Jul. 13, 1990 [JP] Japan ................................ 2-184082
Jun. 17, 1991 [JP] Japan ................................ 3-144852

[51] Int. Cl.$^5$ .................................................. G11B 5/60
[52] U.S. Cl. ................................................... 360/103
[58] Field of Search ........................................ 360/103

[56] References Cited

U.S. PATENT DOCUMENTS

| | | | |
|---|---|---|---|
| 4,700,248 | 10/1987 | Coughlin et al. | 360/103 |
| 4,734,803 | 3/1988 | Nishihara | 360/103 |
| 4,984,114 | 1/1991 | Takeuchi et al. | 360/103 |
| 5,062,017 | 10/1991 | Strom et al. | 360/103 |
| 5,097,369 | 3/1992 | Matsuzaki | 360/103 |

FOREIGN PATENT DOCUMENTS

| | | |
|---|---|---|
| 361658 | 4/1990 | European Pat. Off. . |
| 0073714 | 6/1977 | Japan .................................. 360/103 |
| 53-091716 | 11/1978 | Japan . |
| 54-008514 | 1/1979 | Japan . |
| 59-58661 | 4/1984 | Japan . |
| 60-101781 | 5/1985 | Japan . |
| 1-21713 | 1/1989 | Japan . |
| 1-319188 | 12/1989 | Japan . |
| 2-246067 | 10/1990 | Japan . |

Primary Examiner—John H. Wolff
Attorney, Agent, or Firm—Armstrong, Westerman, Hattori, McLeland & Naughton

[57] ABSTRACT

A head slider for a magnetic disk drive device includes at least a pair of side rails having a surface mating with a magnetic disk, which surface is substantially flat or slightly curved. The side rails define a shallow recess having a width which is gradually increased from an air inlet side to an air outlet side, and a suction force or floating force is generated within the recess. As a result, a taperless slider having a high durability and flying stability and free from an accumulation and deposition of organic vapor is realized.

36 Claims, 15 Drawing Sheets

HEAD SLIDER FOR MAGNETIC DISK DRIVE, HAVING SIDE RAILS WITH GRADUALLY INCREASING WIDTH FORMING A SHALLOW RECESS

BACKGROUND OF THE INVENTION

1. Field of the Invention

The present invention relates to a magnetic disk drive device. More specifically, the invention relates to a floating head slider of a magnetic head used for writing to and reading from data in a recording medium such as a magnetic disk.

2. Description of the Related Art

Magnetic disk drives devices require a magnetic head having a smaller amount of float away from a disk surface (hereinafter, flying height), to obtain a higher recording density, and accordingly, the flying height must be reduced to obtain a greater recording density. Also, due to on increase of the access speed, needed shorten the data search time, a substantially large inertia moment in the direction of access is exerted on the magnetic head and the head slider threof, and thus a low flying type head slider with the enhanced floating stability is required.

In connection with the above, the peripheral speed of rotation of a disk driven to rotate within the disk drive device is different at the radially inner side and radially outer side of the disk, and therefore, the slider must have a smaller fluctuation of the floating height thereof, depending upon the variations of the peripheral speed at radially different portions of the disk.

One example of the conventional floating head slider for the disk drive is disclosed in U.S. Pat. No. 4,734,803. The disclosed embodiment of the magnetic disk drive system employs a tapered flat plate head slider. Such a flat plate head slider includes a pair of side rails, tapered sections formed at the front end portions of the side rails, and a recess defined between the side rails. The side rails function as a pneumatic bearing, and thus have a positive pressure region at a portion along an axis of an air flow generated by a rotation of the magnetic disk. The positive pressure becomes highest at the upstream end portion oriented within the tapered section. The recess is made wide enough that it does not function as a pneumatic bearing. The head slider is biased by a spring load from the back thereof so that the magnetic heat remains in contact with the magnetic disk at a predetermined position thereof while kept inoperative in a contact start and stop (CSS) system. When the magnetic disk starts to rotate, the slider head slides on the disk and lifted at the front end thereof by the air flow generated by the rotation of the disk to thus float over the disk. This construction eliminates, the possibility that the flat head slider will drop onto the disk, and thus has stable flying characteristics.

The construction of such a flat head slider, however, whereby a floating force is generated at the tapered sections, makes it difficult to reduce or lower the flying height. Furthermore, the presence of the tapered sections leads to a possibility of a compression of floating gas within an enclosure of the magnetic disk drive, to thus cause a deposition thereof. This deposition tends to fall onto the disk during operation, to thereby cause head crashing.

In another known floating head slider having stable flying characteristics, a negative pressure generates a negative drawing force (suction force). In such a negative pressure type head slider, the recess has a tapered surface, or as an alternative, a stepped configuration, and the depth of the gap thereof is increased from the air inlet side to outlet side, to thus generate a drawing force. Namely, a negative pressure region is formed within the recess, to generate a drawing force for the disk, and thus the negative pressure type head slider provides a stable flying height regardless of variations of the peripheral speed of the magnetic disk.

In the above-mentioned negative pressure type head slider, however, organic vapor in the device tends to accumulate on the tapered sections or front end face of the step structure. Also, in the stepped configuration, due to an adiabatic expansion caused downstream of the step, floating gas tends to be deposited in the region downstream of the step. Furthermore, it is difficult to couple such a negative pressure type head slider with a rotary type positioner which is suitable for making the device compact, because the rotary type positioner causes a yawing of the head slider due to an angle thereof, and thus a distribution of the negative pressure by the negative pressure type head slider is varied due to this yawing, and this causes a significant amount of rolling, which in the worst case could cause the slider to drop down onto the disk.

One way of reducing or lowering the flying height is to narrow the widths of the side rails, but when the widths of the rails are reduced, the surface pressure at the unit area on the rail section is increased, which lowers the strength of the CSS. In the case of a generally utilized positive pressure head slider, if the depression force is maintained at a constant value, to maintain the ability to withstand external disturbances, the rail width can be narrowed in proportion to 0.033% of the power of the flying height. For example, when the flying height is halved, the surface pressure is increased by 60%. As a countermeasure this problem, a flat plate type head slider not having the tapered section can be used, but since the pressure of the air flow, over such a flat plate type head slider is offset toward the downstream side therof, the loading point also must be offset to coincide with the center of the floating force.

In current high performance devices designed to provide a high speed access, however, the loading point must be orientated in the vicinity of the center of the slider (position of center of gravity) to avoid a yawing of the head slider during the access operation due to a substantial acceleration of the speed thereof in the access direction.

Therefore, even with the flat plate type head slider not provided with the tapered sections, it is difficult to realize a high performance device designed to provide a low flying height and a high speed access.

SUMMARY OF THE INVENTION

Therefore, an object of the present invention is to provide a magnetic head slider which is free from the problem of accumulation or deposit of organic vapor and in which little variation of the flying height occurs due to variations in the peripheral speed at the radially inside and outside portions of the disk.

Another object of the present invention is to provide a magnetic head slider which generates a small amount of floating force able to provide a low flying height.

A further object of the present invention is to provide a magnetic head slider a which little variation of the flying height occurs due to variations of a yawing angle thereof when a rotary type positioner is installed therewith.

The foregoing and other objects of the present invention are obtained by a novel construction of a plate type negative pressure head slider. According to the present invention, to limit the generation of a floating force, the magnetic head slider is provided with at least two side rails not having tapered sections, and a shallow recess is defined between the side rails. The width of this recess is gradually widened from the air inlet side to the air outlet side, thereof, and a negative drawing force is generated within the recess.

According to the present invention, when air is introduced at the front end of the magnetic head slider, a positive floating force is generated in the regions along the side rails, and further a negative drawing force is generated in the recess, by an expansion of the air. In the head slider of the present invention, a sufficient drawing force can be generated by a recess having a depth of approximately 1 to 2 μm. Further, since the floating force becomes large in proportion to the third power of the side rail width, if an additional rail having a different configuration from that of the side rails is provided between the side rails, it becomes equivalent to a division of the side rails in the vicinity of the air inlet side, and it is possible to limit the generation of the floating force while maintaining a rail width of the side rails at the air inlet side thereof necessary for a generation of a sufficient negative drawing force in the recess.

BRIEF DESCRIPTION OF THE DRAWINGS

The present invention will be more fully understood from the detailed discussion given herebelow, and from the accompanying drawings of the preferred embodiments of the invention, which do not limit the invention, as they are included only as an assistnace to an understanding of the present invention.

In the drawings.

DESCRIPTION OF THE PREFERRED EMBODIMENTS

Before providing a detailed discussion of the preferred embodiments of the present invention, the conventional magnetic head sliders will be briefly discussed with reference to FIGS. 1 to 3.

Figure 1:
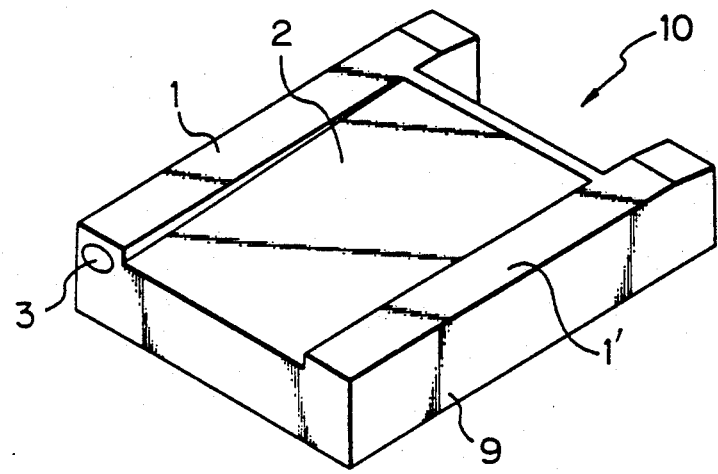
FIGS. 1 to 3 are perspective views showing conventional negative pressure type head sliders.
Figure 2:
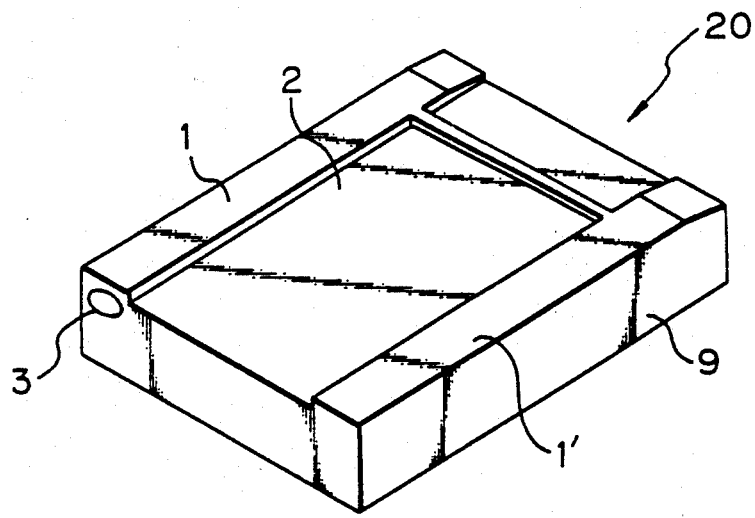

FIGS. 1 and 2 illustrate two types of negative pressure head sliders 10 and 20. These head sliders 10 and 20 generate a negative drawing force due to an inclining of the bottom of the recess 2 defined between side rails 1 and 1' provided on the surface of a base member 9 mating with the magnetic disk as shown in FIG. 1, or as an alternative, due to the forming of a step in the recess 2, as shown in FIG. 2, to thus increase the depth of the recess from the air inlet side to the air outlet side. In FIGS. 1 and 2, reference numeral 3 denotes a magnetic head provided on the air outlet side end of the base member.

As discussed previously, the constructions of the conventional negative pressure head sliders 10 and 20 are defective in that they allow an accumulation of organic vapor flowing within the magnetic disk drive device on the inclined bottom surface or the front side of the step, and in the deposition of floating gas at the downstream side of the step. The accumulation and deposition of organic vapor is one cause of head crashing. Furthermore, these such conventional negative pressure head sliders 10 and 20 suffer from a variation of the distribution of the negative pressure, associated with the yawing angle, it is difficult to combine same with a rotary type positioner.

Figure 3:
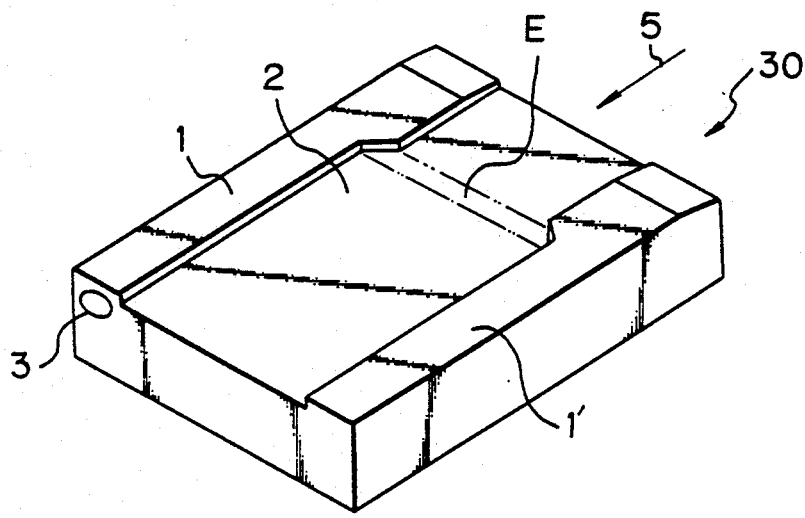

FIG. 3 shows a tapered flat slider as disclosed in U.S. Pat. No. 4,734,803. Components the same as shown in FIGS. 1 and 2 are represented by the same reference numerals. The head slider 30 is characterized by the configuration of the side rails, in which the widths thereof are narrowed from an intermediate section to the rear end thereof. In the head slider 30 of this example, a negative pressure generating region is defined at the position E, in which the widths of the side rails 1 and 1' are gradually narrowed to gradually widen the width of the recess. Whereby the head slider 30 generates a drawing force. Nevertheless, since the had slider so has tapered sections, a large floating force is generated when the air is introduced in the direction of the arrow 5, and the width of the side rails at the upstream end thereof is not wide enough. Accordingly, the variation rate of the recess is small, which limits the generation of the negative pressure to a region in the vicinity of the side rail of the section where the width of the recess is varied. Therefore, a floating force is generated in almost all of the recess 3, and thus it is not possible to reduce the flying height to 1 μm or less.

Figure 4:
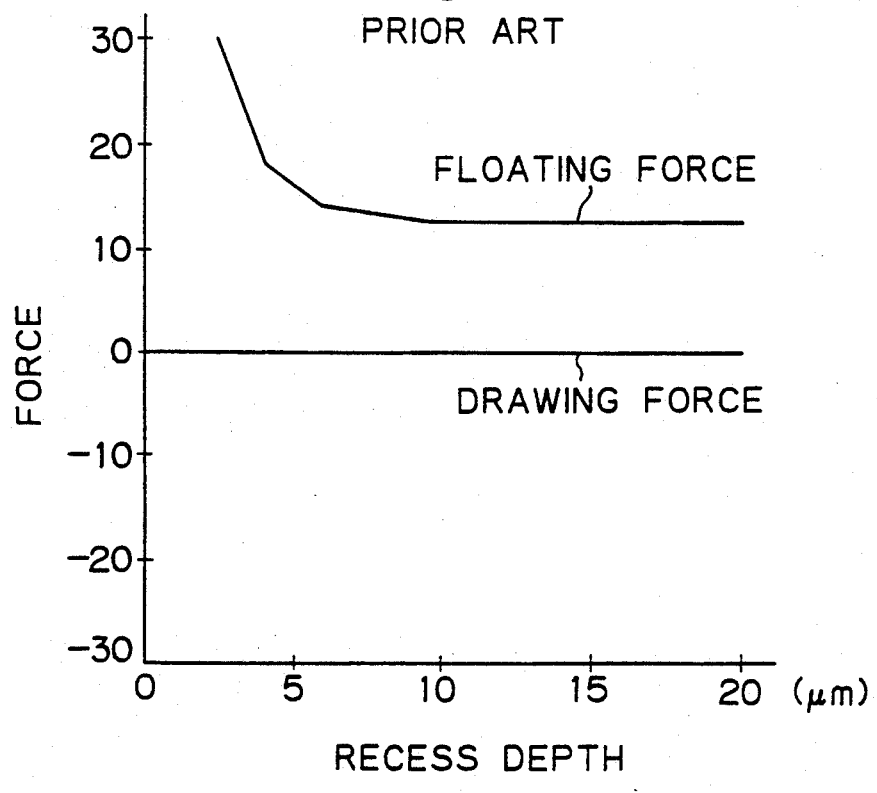
FIG. 4 is a chart showing the relationship between a depth of a recess in the conventional flat type head slider of FIG. 3 and the floating force and drawing force.

FIG. 4 is a chart showing the relationship between the depth of the recess 2 and the floating force and drawing force generated in the head slider of FIG. 3. As can be seen from this figure, the drawing force generated by the head slider of FIG. 3 is approximately 0.033% of the floating force at most, and therefore, it is not possible to realize the flying characteristics achieved by the negative pressure type head sliders. Further, when the depth of the recess 2 is reduced, the floating force generated in the recess 2 is increased, and therefore, it is not possible to reduce the depth of the recess to less than 10 μm. This creates difficulties in the forming the recess, and thus makes it difficult to manufacture the device.

To eliminate the drawbacks encountered in the prior art, the present invention proposes a novel construction of a magnetic head slider in which the side rails do not have tapered sections (hereafter referred to as "taperless slider"), which limits the generation of the floating force and enables a to lowering of the flying height, and thus enables a high speed access to thereby realize a high performance magnetic disk drive device.

Figure 5:
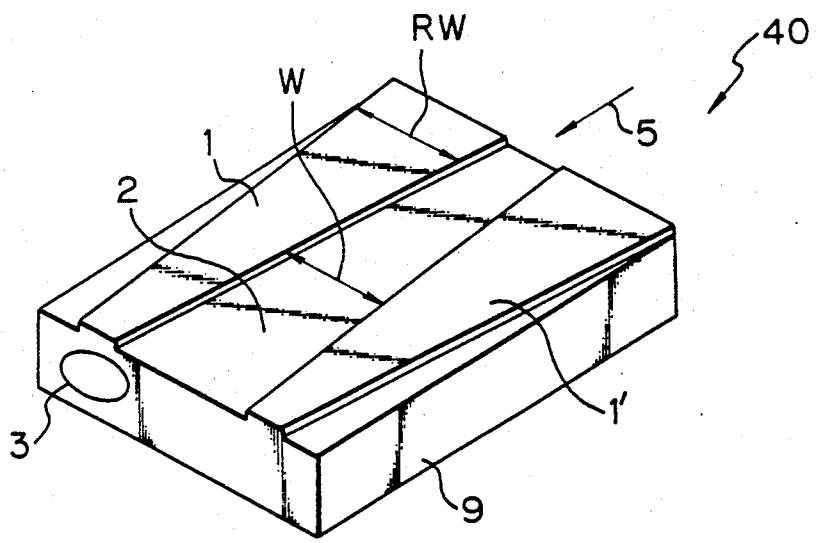
FIG. 5 is a perspective view of the first embodiment of the present invention.

FIG. 5 illustrates the first embodiment of the present invention. In this figure, components the same as in the FIGS. 1 and 2 are represented by the same reference numerals. The head slider 40 in the shown embodiment has a pair of side rails 1 and 1' formed on the surface of the base member 9 mating with the disk, and these side rails do not have a tapered section formed at the front end thereof. The width of the side rails 1 and 1' is gradually made narrower from the air inlet side to the air outlet side, and accordingly, the width of the recess 2 is gradually increased so that it is wider from the air inlet side the air outlet side, to thus form a widening width recess section over the entire length of the head slider 40, and therefore, a negative pressure can be generated at all of regions of the widening width recess section. As in the foregoing examples of the prior art, the magnetic head 3 is provided on the downstream side end face of the base member 9.

The shown taperless construction enables the generation of the floating force to be limited, but in the case of the taperless slider having side rails having a constant width RW, the distribution of the generated floating force is inclined toward the air outlet side. In contrast, according to the shown embodiment, since the widths RW of the side rails 1 and 1' are gradually reduced, the inclination of the distribution of the generated floating force can be compensated to shift the center of the floating force toward the center of the head slider 40. Furthermore, the generated floating force becomes much smaller than that generated in the tapered flat slider as set forth above, and consequently, the taperless slider according to the shown embodiment provides a low flying height with a smaller floating force, and thus is applicable for a high speed access.

Further, in contrast to the conventional negative pressure head sliders which generate a negative pressure due to variations of the depth of the recess, the shown embodiment of the taperless slider advantageously generates the negative pressure by a variation of the width of the recess. For example, when the transverse edges of the recess 2 defined by the edges of the side rails are set at an angled of 60° relative to the longitudinal axis of the head slider 40, variations of the pressure become moderate and do not to cause an accumulation of floating organic vapor, or a deposition of the floating gas material.

Figure 6:
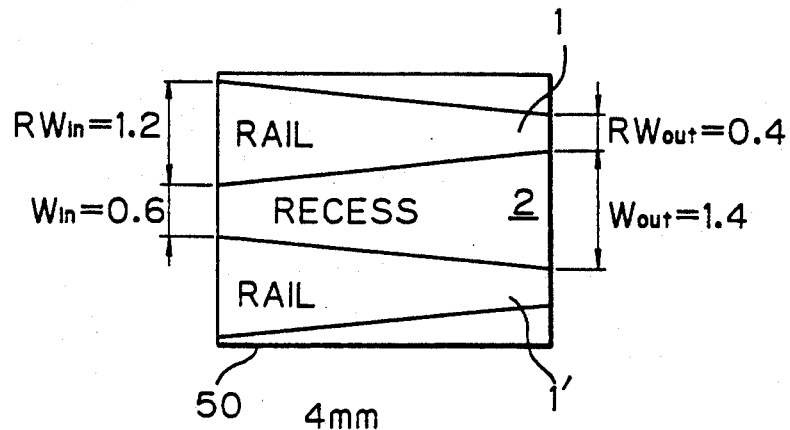
FIG. 6 is a bottom view showing the dimensions of a taperless head slider of FIG. 5.
Figure 7:
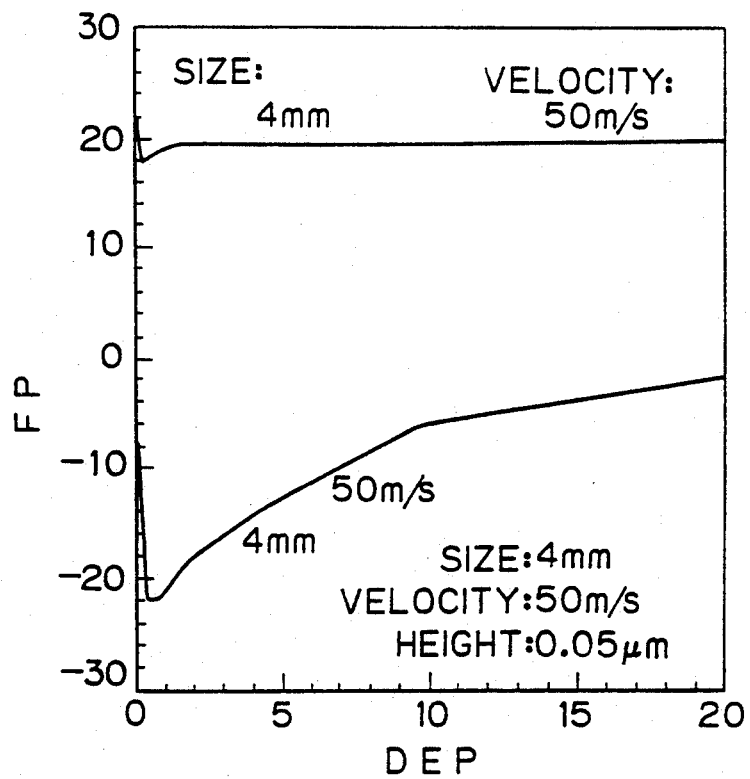
FIG. 7 shows the relationship between a depth of the head slider of FIG. 6 and the floating force and drawing force.

FIG. 6 shows a practical embodiment of the taperless slider 50 having the side rails 1 and 1' with the configuration of FIG. 5. In this embodiment, the head slider 50 has a size of 4 mm. The width RWin of the side rails 1 and 1' at the leading edge is 1.2 mm, and the width RWout at the trailing edge is 0.4 mm. The width win of the recess 2 at the leading edge is 0.6 mm, and the width Wout at the trailing edge is 1.4 mm. The slider 50 thus constructed was arranged at a position at which the peripheral speed of the magnetic disk was 50 m/s, and the flying condition of the magnetic head at a magnitude of 0.05 μm was measured. The resultant floating force and drawing force relative to the depth of the recess 2 is shown in FIG. 7. Here, due to the omission of the tapered section at the front end portion of the head slider 50, the generated floating force becomes less than or equal to 30% of that of the conventional tapered flat head slider with side rails having the same width. Therefore, the width of the side rails 1 and 1' at the upstream end are wide enough, and as a result, the rate of variation of the width of the recess is large enough to generate a sufficient amount of negative pressure. Furthermore, the depth of the recess 2 can be made about 1 μm and still generat a sufficient amount of negative pressure, which faciliates the production of the head slider. As can be seen from FIG. 7, the drawing force is lowered by an increase of the depth of the recess 2, and at a depth of 6 μm, the drawing force of the recess 2 becomes approximately half the peak value, and therefore, to obtain a sufficient drawing force, the depth of the recess 2 must be less than or equal to 6 μm.

Next, the effect of a correction of the center of pressure by the drawing force generated by the taperless slider 40 in the embodiment of FIG. 5 is described. In the shown embodiment of the taperless slider 40, which has the configuration wherein the negative pressure generating section is widened toward the downstream end thereof, the center of the negative drawing force can be offset toward the downstream side from the center of the floating force.

Figure 8A:
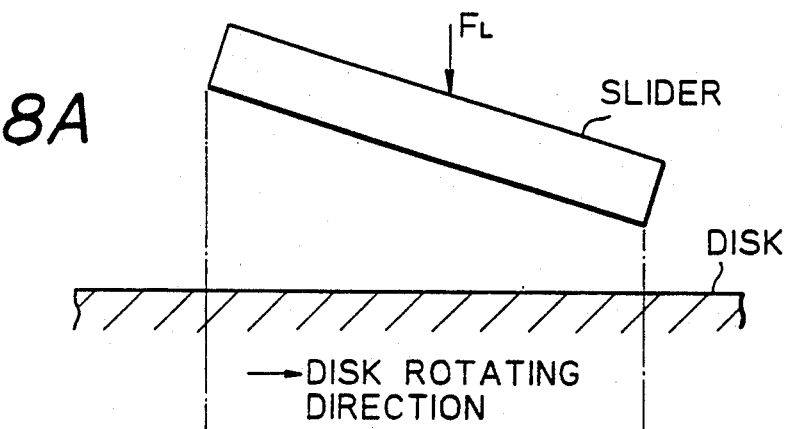
FIGS. 8A to 8C show the equilibrium of a force generated in the embodiment of FIG. 5.
Figure 8B:
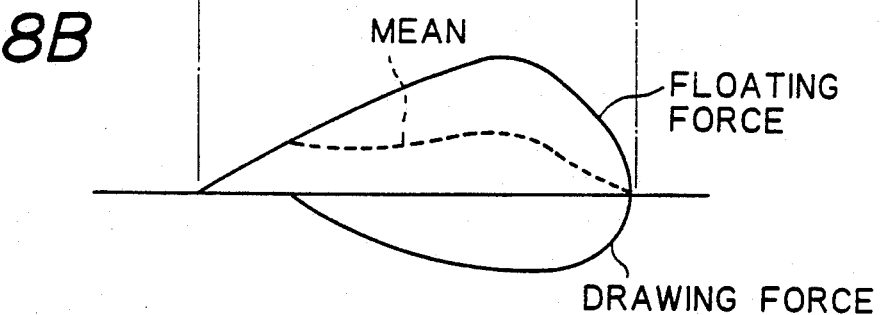
Figure 8C:
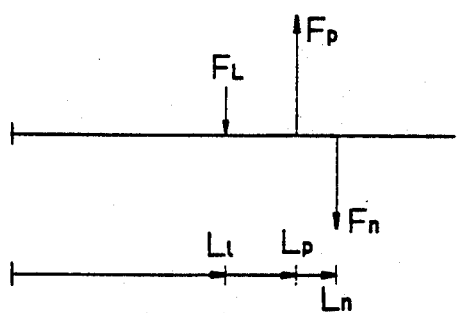

FIGS. 8A to 8C show the equilibrium of the forces, wherein FIG. 8A illustrates magnetic disk and a head slider flying on the disk. When the disk is driven in the direction indicated by the arrow, an equilibrium of the floating force of the medium and the negative drawing forces is established as shown in FIG. 8B. FIG. 8C shows the force balance at this condition, which can be expressed by the following equations:

$$F_P = F_L + F_n \tag{1}$$

$$F_P L_P = F_L \cdot L_L + F_n \cdot L_n \quad (2)$$

From the equations (1) and (2), the following equation can be derived.

$$L_L = L_P - \left( F_n \frac{L_n - L_P}{F_P - F_n} \right) \quad (3)$$

wherein $F_P$ is a positive pressure, $F_L$ is a load (depression force), and $F_n$ is a negative pressure.

In the above equation (3), the second element in the right column becomes negative, and accordingly, the of the center of depression drawing force is shifted toward the air inlet side (toward center of the slider) from the center of the floating force, which is inclined or offset toward the downstream side in the taperless slider, and thus the magnitude of the yawing of the head slider upon access can be reduced. Therefore, according to the shown embodiment, a head slider can be realized which has a small amount of yawing upon access, and thus can be used for a high speed access and can avoid an increase of the surface pressure due to a reduction of the flying height and a lowering of the CSS strength.

Figure 9:
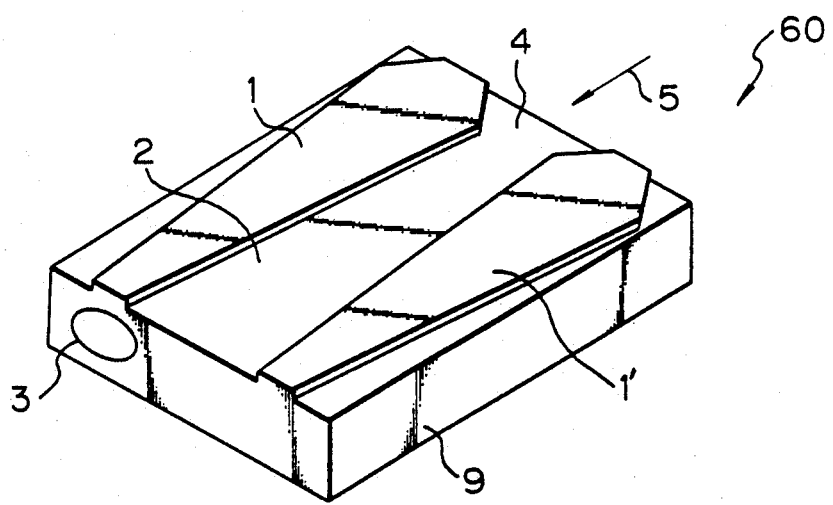
FIG. 9 is a perspective view of the second embodiment of the invention.

FIG. 9 shows a second embodiment of the taperless slider 60 according to the present invention. In the drawing, the same portions as shown in FIG. 5 are represented by the same reference numerals. The shown embodiment is basically similar to the former embodiment, and is differentiated only in that the rails 1 and 1' are cut out at the ends of the air inlet side, to define a narrowed width recess section 4 as a part of the recess 2, in which the width is narrowed from the air inlet side to the air outlet side.

The shown embodiment generates a positive pressure at the portion in which the width of the recess 2 is narrowed from the air inlet side to the air outlet side, and therefore, the pitching strength which tends to be short in the flat plate type and crown type head sliders, can be improved. Also, an accumulation of floating organic vapor and a deposition of floating gas can be successfully prevented, as in the first embodiment.

Figure 10:
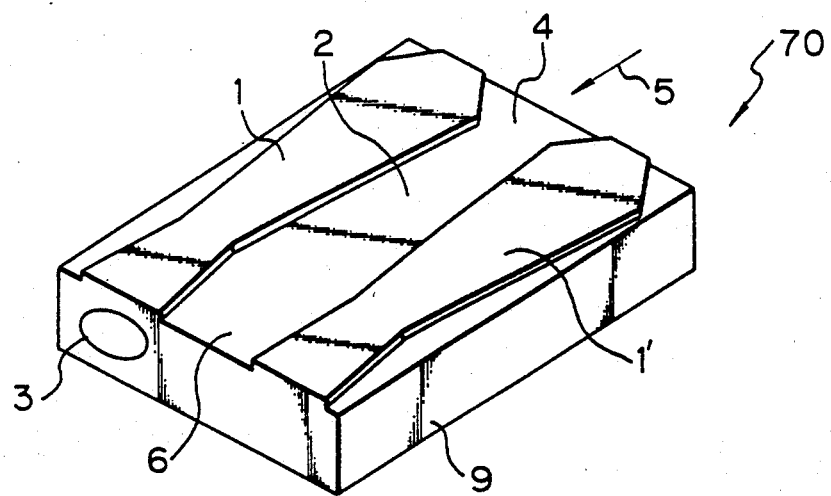
FIG. 10 is a perspective view of the third embodiment of the invention.

FIG. 10 shows the third embodiment of the taperless slider 70 according to the present invention. In the drawing, the same portions as shown in FIG. 9 are represented by the same reference numerals. The shown embodiment is basically the same as the former embodiment, and is differentiated only in that the widths of the rails 1 and 1' are widened from the intermediate portion at the side of the air outlet side toward the outlet end. Therefore, the width of the recess 2 is narrowed from the intermediate portion in the air outlet side to the outlet end.

With the construction set forth above, this embodiment can provide the same effect as the former embodiment. In addition, this embodiment can increase the positive pressure force at the outlet side, for a further improvement of the pitching strength. Furthermore, by setting the inclination angle of the transverse edges of the recess at the portion where the width of the side rails are narrowed, with respect to the longitudinal axis of the head slider to be greater than or equal to the maximum yawing angle of the slider employed in the disk drive device, variations of the flying height caused by variations of the yawing angle, can be reduced. This function will be discussed later.

Figure 11:
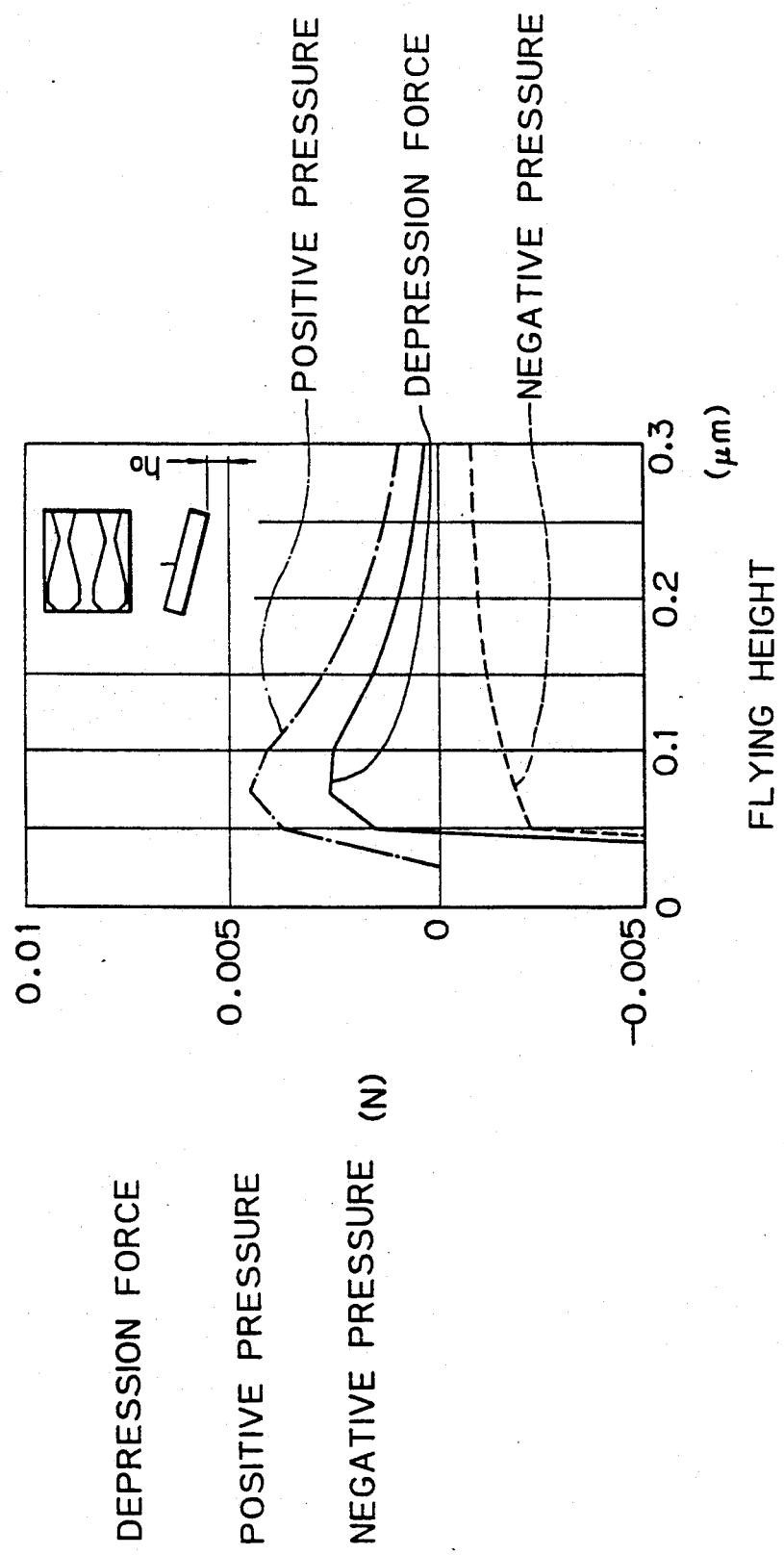
FIG. 11 is a chart showing the relationship between the flying height of the flat plate type taperless head slider of FIG. 10 and the depression force, positive pressure and negative pressure.
Figure 12:
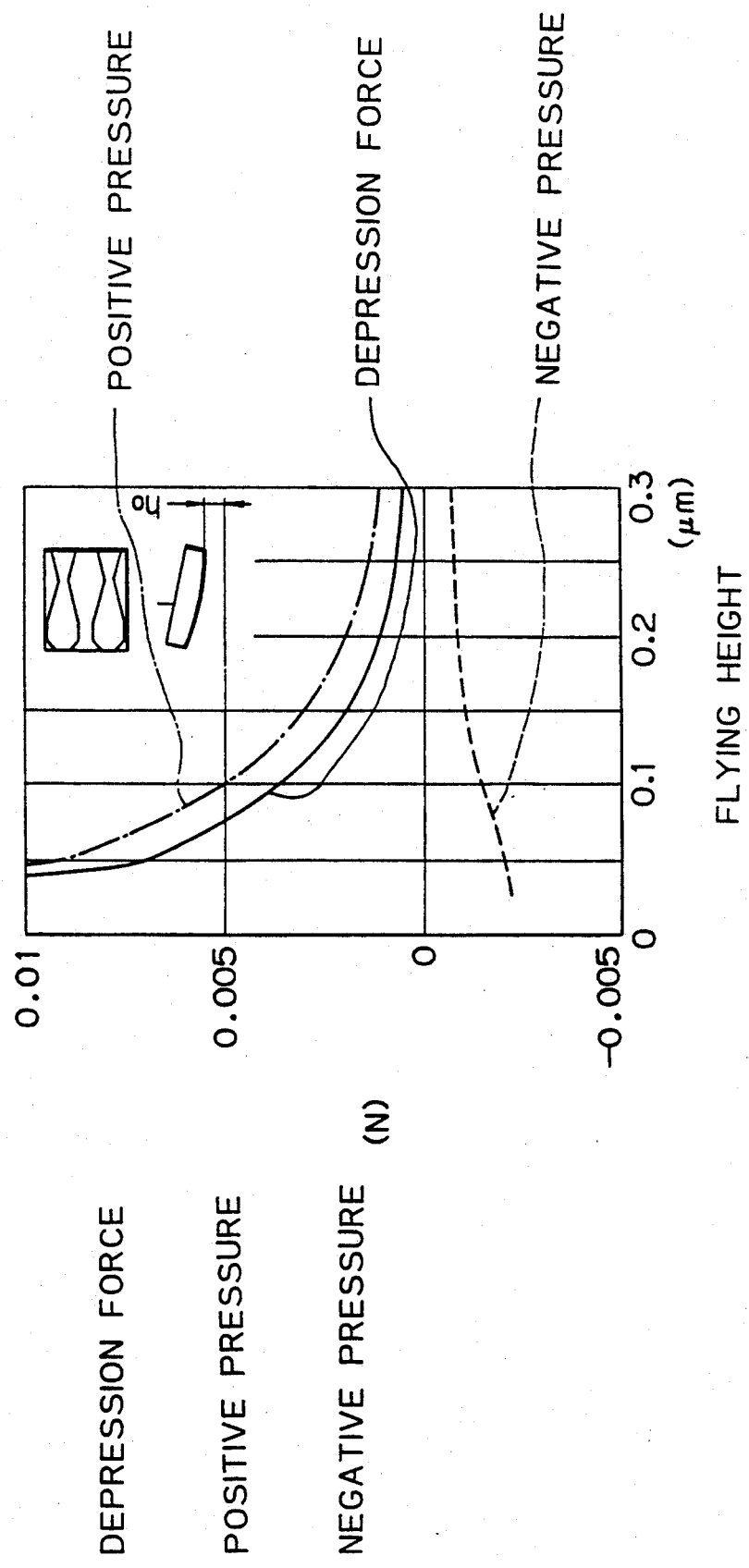
FIG. 12 is a chart showing the relationship between the flying height of the crown type taperless head slider having side rails configurated as illustrated in FIG. 10, and the depression force, positive pressure and negative pressure.

Note, the first to third embodiments as set forth above are applicable to a crown type head slider, and when the first to third embodiments are applied to the flat plate type head slider an unstable floating condition can arise depending upon the orientation of the loading position. FIG. 11 shows relationship between the floating force, negative drawing force, and a depression force for establishing an equilibrium with both forces, to thus establish a balanced attitude at the flying height shown in the quadrature axis. The center of the depression force is set at the center of the head slider. In this example, in a region where the flying height is low, an unstable floating condition occurs in which, when the floating force is lowered, the depression force, as the composite force of the floating force and the drawing force, is also lowered.

In comparison with such flat plate type taperless slider, a crown type taperless slider which is slightly curved to an amount of 10 nm on the surface mating with the disk, any instability of the floating attitude in the low flying height range can be suppressed by preventing a reduction of the elevating angle, and thus the unstable floating problem can be resolved without a substantial increase of the flying height, as shown in FIG. 9.

Figure 13:
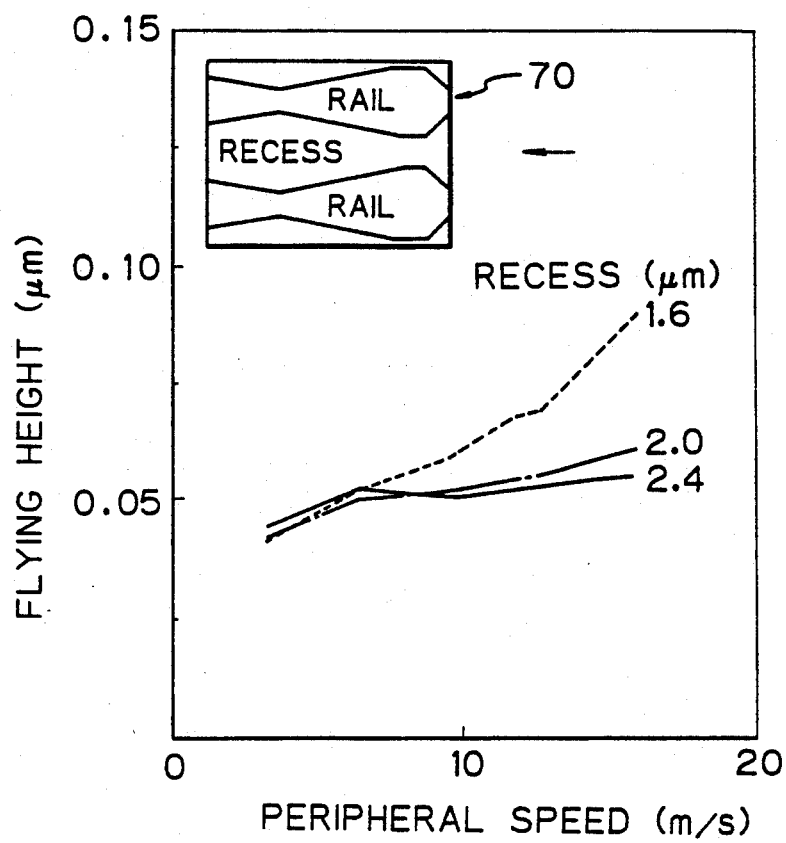
FIG. 13 is a chart showing variations of the flying height relative to a peripheral speed of the taperless head slider having side rails configurated as shown in FIG. 10, using the depth of the recess as a parameter.

FIG. 13 shows the relationship between the peripheral speed of the disk and the flying height when the depth of the recess is varied between 1.6 μm, 2.0 μm, and 2.4 μm in the taperless slider 70 of FIG. 10. As can be seen from this figure, the flying height of the taperless slider can be maintained at a constant value, regardless of the peripheral speed, by setting the depth of the recess to an optimum value.

Figure 14:
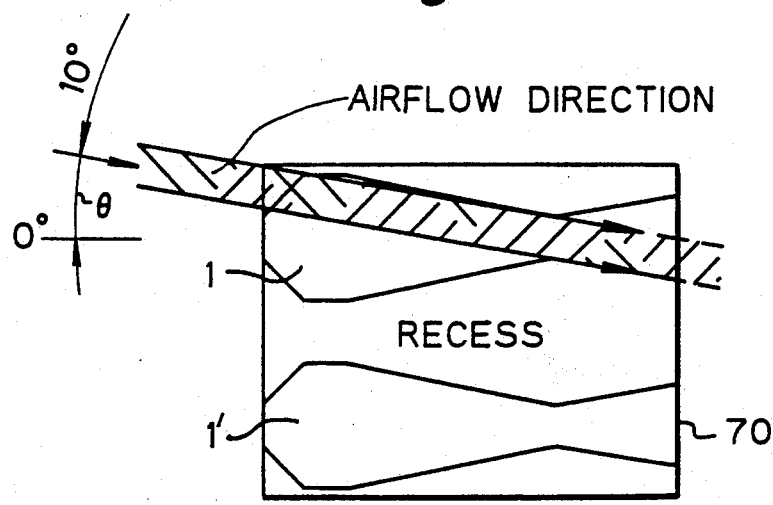
FIG. 14 is an illustration showing the air flow at a yawing angle of 10° of the taperless head slider having the side rail configuration as shown in FIG. 10.
Figure 15:
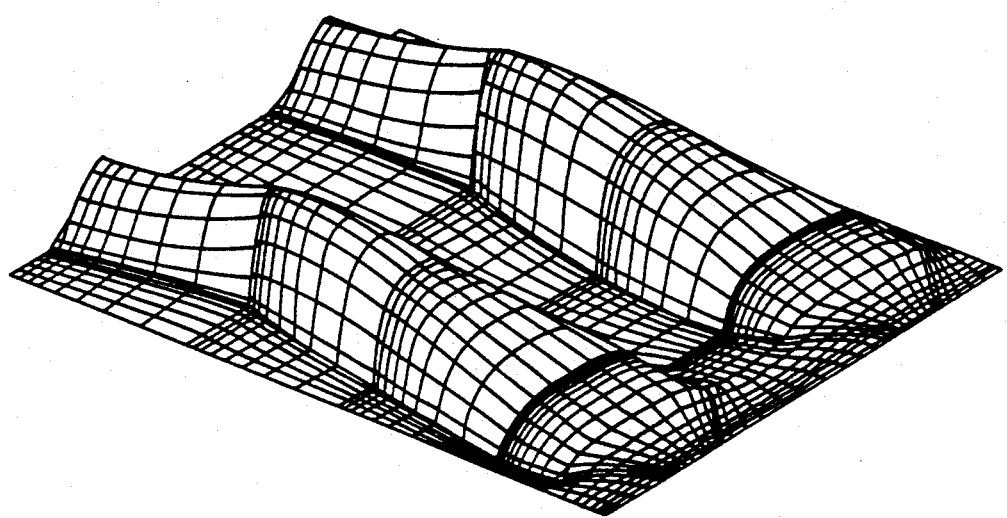
FIG. 15 is an illustration showing the pressure distribution at a yawing angle of 0° of the taperless head slider having the side rail configuration as shown in FIG. 10.
Figure 16:
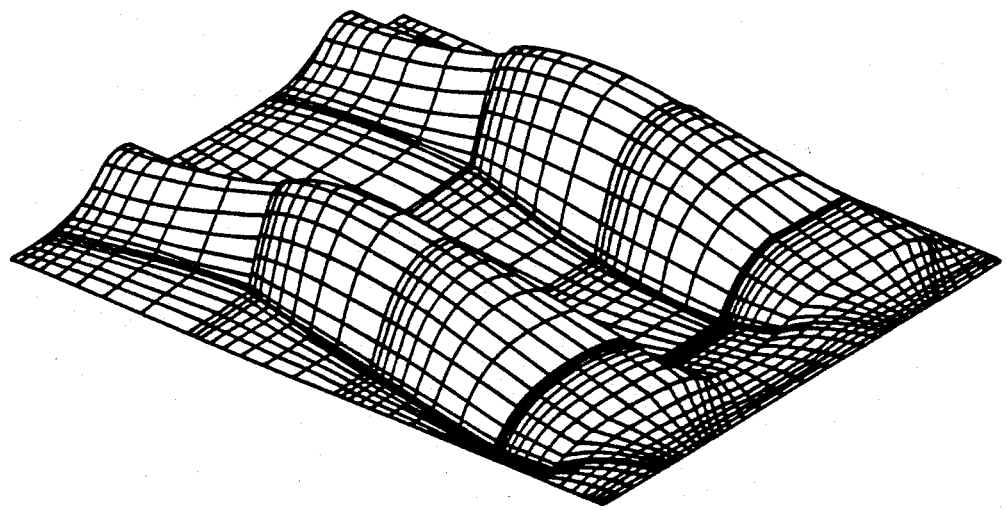
FIG. 16 is an illustration showing the pressure distribution at a yawing angle of 10° of the taperless head slider having the side rail configuration as shown FIG. 10.

Here, the elimination of variations of the flying height relative to the yawing angle will be discussed with reference to FIGS. 14 to 17. FIG. 14 shows the air flow direction at the yawing angle of 10° (yawing angle of the longitudinal axis of the slider is 10°). In the taperless slider of FIG. 10, the configuration of the side rails 1 and 1' are designed to make the air flow at the air outlet end uniform regardless of the yawing angle, and thus the effect of the yawing angle on the the flying height is eliminated. This will be further discussed with reference to FIGS. 15 and 16. FIG. 15 shows pressure distribution in the taperless slider 70 of FIG. 10 at the yawing angle of 0°. As can be seen from the figure, the maximum pressure is generated along the center line of the side rails 1 and 1', and the minimum pressure is generated along the center line of the recess 2. FIG. 16 shows the pressure distribution in the taperless slider 70 of FIG. 10 at the yawing angle of 10°. Comparing these two pressure distribution charts, it can be understood that almost no variation is caused, depending upon the presence or absence of the yawing angle.

Figure 17:
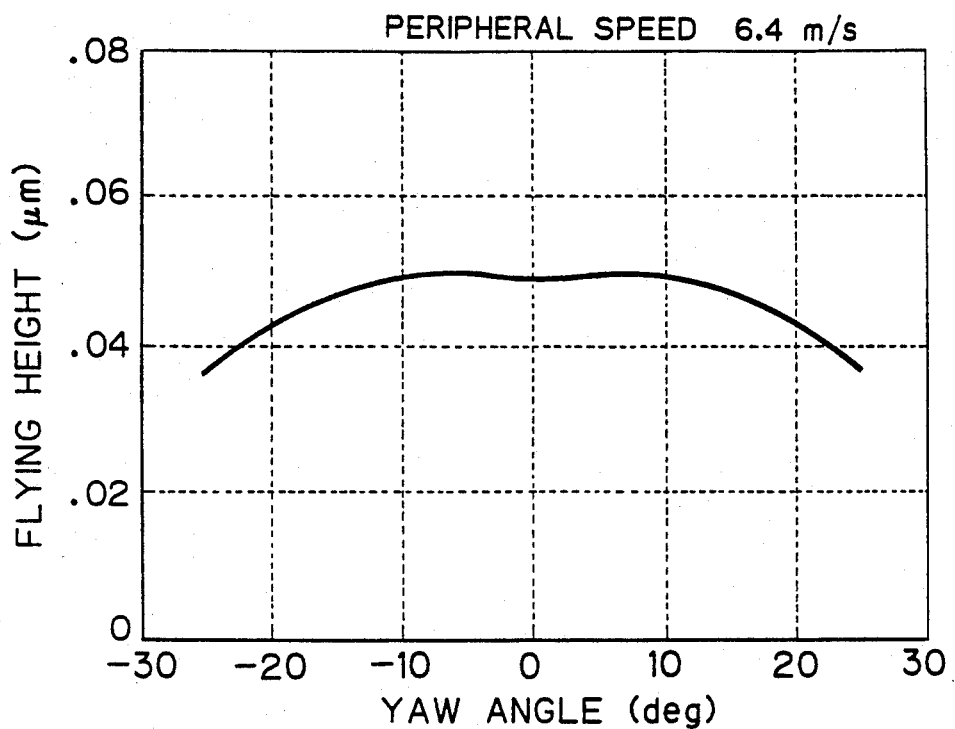
FIG. 17 is a chart showing variations of the flying height relative to the yawing angle of the crown type taperless head slider having the side rail configuration as shown in FIG. 10.
Figure 18:
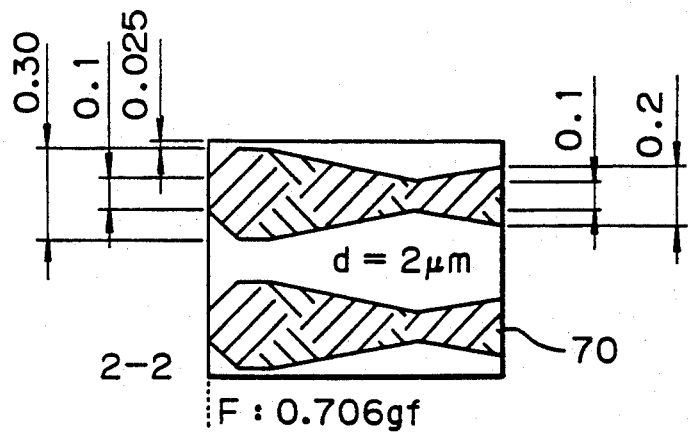
FIG. 18 is a bottom view showing an example of the dimensions of the crown type taperless head slider having the side rail configuration as shown in FIG. 10, for obtaining the characteristics shown in FIG. 17.

FIG. 17 shows variations of the flying height of the taperless slider 70 when the yawing angle is varied within a range of ±30° at a peripheral speed of 6.4 m/s, in which the practical dimension of the taperless slider 70 of FIG. 10 is set to a crown of 10 nm as shown in FIG. 18. From this figure it can be appreciated that, when the slider is utilized under the condition set forth above, the flying height can be maintained at a substantially constant value within a yawing angle range of ±10°. Therefore, by making the angle between the longitudinal line of the slider and the side line of the part of the recess where the width thereof is widened to be greater than or equal to the maximum yawing angle of the device whrein the slider is used, the amount of air flow arriving at the trailing edge of the slider becomes constant regardless of the yawing angle of the slider. Therefore, variation of flying height relative to variations of the yawing angle can be successfully suppressed.

It should be noted that it is also possible to provide an outer recess along the outer side of the side rails 1 and 1', to ensure a most suitable position of the side rails 1 and 1'. This reduces the amount of rolling in the slider due to variations of the yawing angle to substantially zero.

Figure 19:
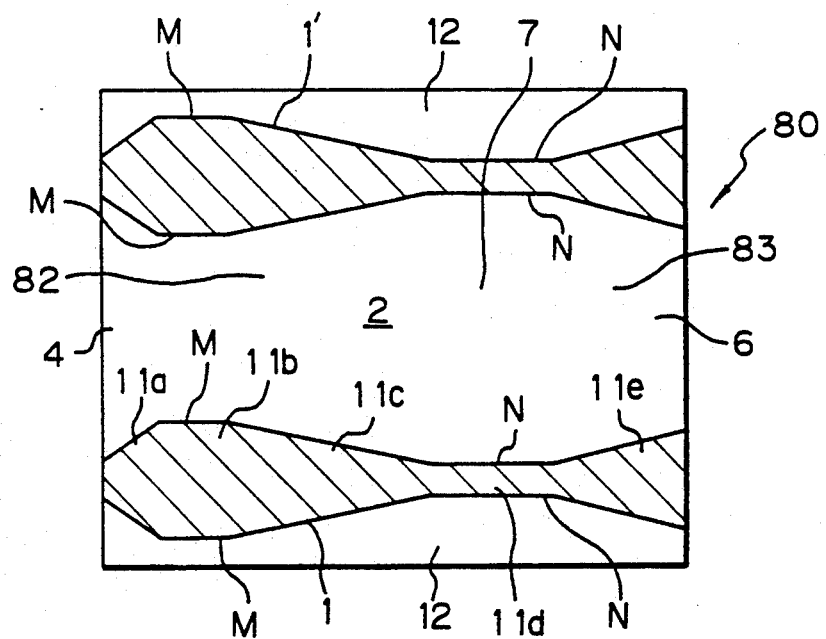
FIG. 19 is a bottom view of the fourth embodiment of the invention.

FIG. 19 shows a fourth embodiment of the taperless slider 80 of the present invention. In this figure, the same portions of the taperless slider 70 as shown in FIG. 10 are represented by the same reference numerals. The shown embodiment is basically the same as the former embodiment and is differentiated only in that the rail sections 1 and 1' of FIG. 7 are cut out at portions M at the joining portion of the narrowed width recess section 4 and widening width recess section 82, so that the edges thereof can be oriented substantially in parallel to each other and to the longitudinal axis of the slider. The rail sections 1 and 1' are also cut out at a portion N at the upstream end of the air outlet side narrowed width recess section, so that the edges thereof become parallel to each other and to the longitudinal axis of the slider to thus define a constant width recess section 7. With the shown construction, as there is no limitation due to the slider length and rail width, the angle to be formed by the edges of the rails 1 and 1' and the longitudinal axis can be set to be greater than or equal to the maximum yawing angle of the apparatus in which the head slider is employed.

In this embodiment, at the entrance part of the bulged section 11e of the side rails near the air outlet side, the pressure of the flowing air can be maintained substantially at the pressure of the atmosphere, regardless of the yaw angle, because of the existence of the constant width recess section 7 formed by the narrow width section 11d of the side rail. Also, the variation of the amount of air flow at the side rails 1 and 1' in accordance with the degree of the yaw angle will be reduced by the effect of the inclination angle of the side lines of the bulged section 11a near to the air inlet side and the bulged section 11e near to the air outlet side of the side rails 1 and 1'. Therefore, the floating force can be maintained at a substantially constant value regardless the yawing angle. The reference numeral 12 denotes recesses formed outside of the side rails 1 and 1'. These recesses 12 enable the side rails 1 and 1' to be set at the optimum position at which the amount of rolling of the slider caused by variations of the yawing angle is substantially zero.

Figure 20:
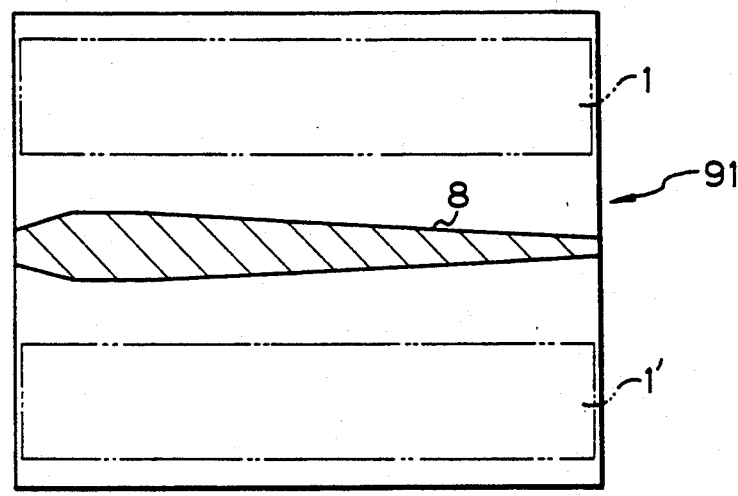
FIG. 20 is a bottom view of the fifth embodiment of the present invention.
Figure 21:
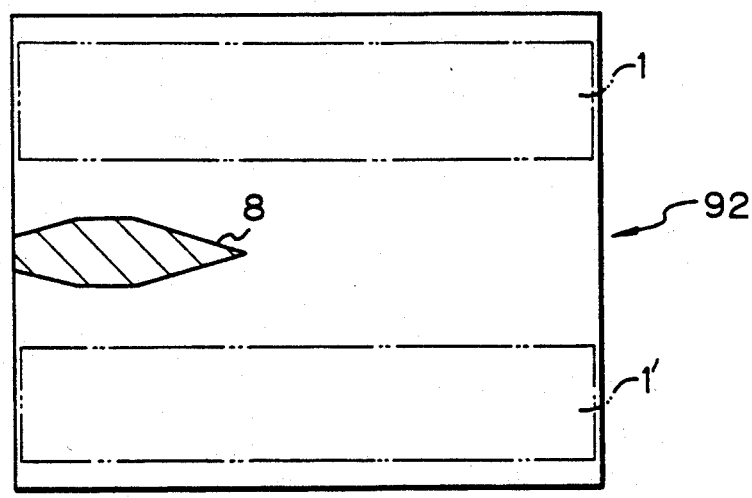
FIG. 21 is a bottom view of the sixth embodiment of the present invention.

FIGS. 20 and 21 are bottom views of the fifth and sixth embodiments of the taperless slider 91 and 92 according to the present invention. In these figures, the same portions as shown in the other embodiments are represented by the same reference numerals. The shown embodiments are similar to the former embodiments, and are differentiated only in that third rails 8 having configuration different from that of the rails 1 and 1' are provided. The third rails have wider width at the air inlet side than at the air outlet side, and one or more third rails are provided between the rails 1 and 1'. Note, the third rail 8 need not be extended through out the overall length between the air inlet side and the air outlet side, and can be terminated at the intermediate portion as shown in FIG. 21.

Figure 22:
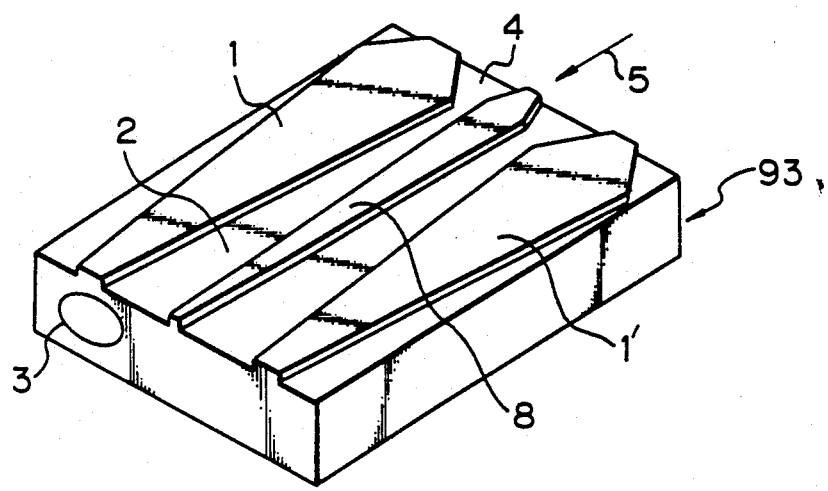
FIG. 22 is a perspective view of the application of the fifth embodiment to the slider of FIG. 9.
Figure 23:
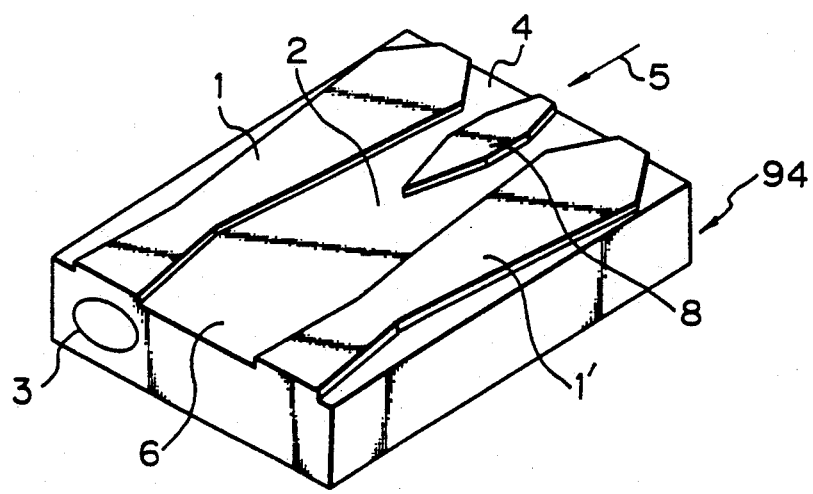
FIG. 23 is a perspective view of the application of the sixth embodiment to the head slider of FIG. 10.

FIG. 22 is a perspective view of a construction in which the third rail 8 shown in FIG. 20 is added to the embodiment of FIG. 9, and FIG. 23 is a perspective view of the construction in which the third rail of FIG. 21 is added to the head slider of FIG. 10.

The advantages of the construction in which the third rail 8 is provided in the recess 2 between the rail sections 1 and 1' are now discussed. In general, with such a negative pressure head slider, it is necessary to maintain the ratio of the widths of the widening width recess section and the narrowed width recess section of the thin recess 2, to obtain sufficient negative pressure drawing force. Therefore, the widths of the rail sections 1, 1' and the thin recess 2 must be approximately equal to each other. On the other hand, to maintain the rolling strength of an air bearing, a slider width corresponding to the slider size is required. Accordingly, in the case of a large size slider, wide rail sections 1, 1' becomes necessary. Nevertheless, although the negative pressure drawing force of the slider becomes large in proportion to a square value of the slider size, the floating force becomes large in proportion to the fourth power value thereof. Accordingly, the head slider having a figure which is designed to be most suitable for a particular size thereof cannot be made optimum for a large size head slider even if it has a similar figure, and the floating force becomes excessive in a large size head slider having similar figures. Therefore in these embodiments, the third rail 8 is provided within the recess 2 between the side rails 1 and 1', instead of simply widening the width of the side rails 1 and 1', because the floating force generated by the side rails 1 and 1' becomes large in proportion to the third power of the width of the side rail. This is equivalent to dividing the rail sections 1 and 1' at the air inlet side to thus maintain a sufficient width of the rail for generating a sufficient drawing force in the recess and reduce the floating force generated. Furthermore, the third rail 8 need not be extended throughout the overall length, but can be terminated at the intermediate portion. In such a case, the throttling effect for generating the negative pressure drawing force in the thin recess can be increased. As set forth above, by providing the third rail 8, the present invention provides a high durability and floating stability regardless of the size of the slider.

As set forth above, according to the present invention, a negative pressure head slider can be provided with a high floating stability, small flying height variations depending upon the yawing angle, no accumulation of floating organic vapor and deposits of floating gas and no possibility of head crashing, and thus is very reliable. Furthermore, restrictions of the size of the head slider can be eliminated.

What is claimed is:

1. A magnetic head slider for mounting a magnetic head for writing data into and reading data from a rotating magnetic disk in a magnetic disk drive device, comprising:

a base member having a surface mating with said magnetic disk, the entire area of said surface being flat;

a pair of side rails formed on said surface mating with said magnetic disk, for generating a floating force and having end surfaces, the width of each of said side rails being gradually increased from an air inlet end from which air is introduced toward an air outlet end from which the air is discharged, and subsequently being gradually reduced toward said air outlet end; and a shallow recess defined between said side rails on said base member and forming a negative pressure generating region having a width which is gradually increased from the air inlet end to the air outlet end.

2. A magnetic head slider as set forth in claim 1, wherein the depth of said recess is less than or equal to 6 μm.

3. A magnetic head slider as set forth in claim 1, wherein a gradient angle of widening of said recess is less than or equal to 60°.

4. A magnetic head slider as set forth in claim 1, wherein a gradient angle of widening of said recess is greater than or equal to the maximum yawing angle of the slider.

5. A magnetic head slider as set forth in claim 1, wherein stepped regions are formed on said base member at orientations outside of said side rails.

6. A magnetic head slider as set forth in claim 1, wherein said side rails have a constant height from said base member.

7. A magnetic head slider as set forth in claim 1, which further comprises an intermediate rail disposed between said side rails and extending from said air inlet end to said air outlet end.

8. A magnetic head slider as set forth in claim 7, wherein a predetermined length of said intermediate rail extends from said air inlet end.

9. A magnetic head slider for mounting a magnetic head for writing data into and reading data from a rotating magnetic disk in a magnetic disk drive device, comprising:
a base member having a surface mating with said magnetic disk, the entire area of said surface being flat:
a pair of side rails formed on said surface mating with said magnetic disk, for generating a floating force, and having end surfaces, the width of each of said side rails being gradually increased from an air inlet end from which air is introduced toward an air outlet end from which the air is discharged, subsequently being gradually increased to said air outlet end; and
a shallow recess defined between said side rails on said base member, the width thereof being gradually reduced at the air inlet end thereof and subsequently gradually increased toward said air outlet end to thereby form a negative pressure generating region, and thereafter gradually reduced at said air outlet end.

10. A magnetic head slider as set forth in claim 9, wherein the depth of said recess is less than or equal to 6 μm.

11. A magnetic head slider as set forth in claim 9, wherein a gradient angle of widening of said recess is less than or equal to 60°.

12. A magnetic head slider as set forth in claim 9, wherein a gradient angle of widening of said recess is greater than or equal to the maximum yawing angle of the slider.

13. A magnetic head slider as set forth in claim 9, wherein the width of said recess is gradually reduced at the air inlet end toward said air outlet end, and then is gradually increased toward said air outlet end to thereby form a negative pressure generating region, and subsequently is maintained at a constant value, and thereafter gradually reduced at said air outlet end.

14. A magnetic head slider as set forth in claim 9, wherein the gradient angle at a portion where the widths of said side rails are gradually reduced, is greater than or equal to a maximum yawing angle of the slider.

15. A magnetic head slider as set forth in claim 9, wherein stepped regions are formed on said base member at orientations outside of said side rails.

16. A magnetic head slider as set forth in claim 9, wherein said side rails have a constant height from said base member.

17. A magnetic head slider as set forth in claim 9, which further comprises an intermediate rail disposed between said side rails and extending from said air inlet end to said air outlet end.

18. A magnetic head slider as set forth in claim 17, wherein a predetermined length of said intermediate rail extends from said air inlet end.

19. A magnetic head slider for mounting a magnetic head for writing data into and reading data from a rotating magnetic disk in a magnetic disk drive device, comprising:
a base member having a surface mating with said magnetic disk, the entire area of said surface being slightly curved in an air flow direction;
a pair of side rails formed on said surface mating with said magnetic disk, for generating a floating force and having end surfaces, the width of each of said side rails being gradually increased from an air inlet end from which air is introduced toward an air outlet end from which the air is discharged, and subsequently being gradually reduced toward said air outlet end; and
a shallow recess defined between said side rails on said base member and forming a negative pressure generating region having a width which is gradually increased from the air inlet end to the air outlet end.

20. A magnetic head slider as set forth in claim 19, wherein the depth of said recess is less than or equal to 6 μm.

21. A magnetic head slider as set forth in claim 19, wherein a gradient angle of widening of said recess is less than or equal to 60°.

22. A magnetic head slider as set forth in claim 19, wherein a gradient angle of widening of said recess is greater than or equal to the maximum yawing angle of the slider.

23. A magnetic head slider as set forth in claim 19, wherein stepped regions are formed on said base member at orientations outside of said side rails.

24. A magnetic head slider as set forth in claim 19, wherein said side rails have a constant height from said base member.

25. A magnetic head slider as set forth in claim 19, which further comprises an intermediate rail disposed between said side rails and extending from said air inlet end to said air outlet end.

26. A magnetic head slider as set forth in claim 25, wherein a predetermined length of said intermediate rail extends from said air inlet end.

27. A magnetic head slider for mounting a magnetic head for writing data into and reading data from a rotating magnetic disk in a magnetic disk drive device, comprising:
a base member having a surface mating with said magnetic disk, the entire area of said surface being slightly curved in an air flow direction;
a pair of side rails formed on said surface mating with said magnetic disk, for generating a floating force and having end surfaces, the width of each of said side rails being gradually increased from an air inlet end from which air is introduced toward an air outlet end from which the air is discharged, subsequently being gradually increased to said air outlet end; and a shallow recess defined between said side rails on said base member, the width thereof being gradually reduced at the air inlet end thereof and subsequently gradually increased toward said air outlet end to thereby form a negative pressure generating region, and thereafter gradually reduced at said air outlet end.

28. A magnetic head slider as set forth in claim 27, wherein the depth of said recess is less than or equal to 6 μm.

29. A magnetic head slider as set forth in claim 27, wherein a gradient angle of widening of said recess is less than or equal to 60°.

30. A magnetic head slider as set forth in claim 27, wherein a gradient angle of widening of said recess is greater than or equal to the maximum yawing angle of the slider.

31. A magnetic head slider as set forth in claim 27, wherein the width of said recess is gradually reduced at the air inlet end toward said air outlet end, and then is gradually increased toward said air outlet end to thereby form a negative pressure generating region, and subsequently is maintained at a constant value, and thereafter gradually reduced at said air outlet end.

32. A magnetic head slider as set forth in claim 27, wherein the gradient angle at a portion where the widths of said side rails are gradually reduced, is greater than or equal to a maximum yawing angle of the slider.

33. A magnetic head slider as set forth in claim 27, wherein stepped regions are formed on said base member at orientations outside of said side rails.

34. A magnetic head slider as set forth in claim 27, wherein said side rails have a constant height from said base member.

35. A magnetic head slider as set forth in claim 27, which further comprises an intermediate rail disposed between said side rails and extending from said air inlet end to said air outlet end.

36. A magnetic head slider as set forth in claim 35, wherein a predetermined length of said intermediate rail extends from said air inlet end.

* * * * *